(12) United States Patent
Ito

(10) Patent No.: US 12,483,037 B2
(45) Date of Patent: Nov. 25, 2025

(54) POWER CONVERTER, POWER SYSTEM, AND CONTROL METHOD OF POWER CONVERTER

(71) Applicant: FURUKAWA ELECTRIC CO., LTD., Tokyo (JP)

(72) Inventor: Mitsuhiro Ito, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/229,612

(22) Filed: Jun. 5, 2025

(65) Prior Publication Data

US 2025/0300464 A1 Sep. 25, 2025

Related U.S. Application Data

(63) Continuation of application No. PCT/JP2023/043718, filed on Dec. 6, 2023.

(30) Foreign Application Priority Data

Dec. 6, 2022 (JP) ................... 2022-195081

(51) Int. Cl.
H02J 3/38 (2006.01)
H01M 10/44 (2006.01)
H02J 3/32 (2006.01)

(52) U.S. Cl.
CPC ............. H02J 3/381 (2013.01); H01M 10/44 (2013.01); H02J 3/322 (2020.01); *H02J 2300/24* (2020.01)

(58) Field of Classification Search
CPC ...... H02J 3/38; H02J 3/381; H02J 3/32; H02J 3/322; H02J 2300/24; H01M 10/44
See application file for complete search history.

(56) References Cited

U.S. PATENT DOCUMENTS

2012/0173034 A1 7/2012 Taima
2013/0096725 A1 4/2013 Ishida et al.
(Continued)

FOREIGN PATENT DOCUMENTS

JP 2015-116011 A 6/2015
JP 2022-82194 A 6/2022
(Continued)

OTHER PUBLICATIONS

International Search Report and Written Opinion mailed Feb. 20, 2024, in International Application No. PCT/JP2023/043718 filed Dec. 6, 2023, 7 total pages.

*Primary Examiner* — Robert L Deberadinis
(74) *Attorney, Agent, or Firm* — Oblon, McClelland, Maier & Neustadt, L.L.P.

(57) ABSTRACT

A power converter includes: a power conversion unit configured to convert power input from a bus, output the converted power to a power element, convert power input from the power element, and output the converted power to the bus; a measurement unit configured to measure an electrical characteristic value of power input to and from the power conversion unit; a storage unit configured to store a first reference function and a second reference function; a setting unit configured to set a power conversion characteristic of the power conversion unit based on an electrical characteristic value; and a management unit configured to manage a renewable energy charge amount and manage an amount of power derived from renewable energy supplied from the power element.

8 Claims, 13 Drawing Sheets

(56) References Cited

U.S. PATENT DOCUMENTS

| | | |
|---|---|---|
| 2017/0363666 A1 | 12/2017 | Alkuran et al. |
| 2022/0166216 A1 | 5/2022 | Suzuki et al. |
| 2024/0405243 A1 | 12/2024 | Sato et al. |
| 2024/0413736 A1 | 12/2024 | Ito |

FOREIGN PATENT DOCUMENTS

| | | |
|---|---|---|
| JP | 7088587 B1 | 6/2022 |
| WO | WO 2012/002001 A1 | 1/2012 |
| WO | WO 2012/032947 A1 | 3/2012 |
| WO | WO 2023/162298 A1 | 8/2023 |

POWER CONVERTER, POWER SYSTEM, AND CONTROL METHOD OF POWER CONVERTER

This application is a continuation of International Application No. PCT/JP2023/043718, filed on Dec. 6, 2023 which claims the benefit of priority of the prior Japanese Patent Application No. 2022-195081, filed on Dec. 6, 2022, the entire contents of which are incorporated herein by reference.

BACKGROUND

The present disclosure relates to a power converter, a power system, and a method of controlling a power converter.

As an alternative to a large-scale electric power network dependent on fossil energy and nuclear energy, an electric power network using power of local production for local consumption has attracted attention. A wide variety of devices such as a photovoltaic (PV) power generation device that is a power generation device that generates power using renewable energy, a stationary electrical storage device, and an electric vehicle (EV) are connected to the electric power network using the power of local production for local consumption.

As a technique for managing renewable energy generated in such an electric power network, for example, there is an electric power management system disclosed in JP 2022-82194 A. A power supply and demand management device of this system manages a date and time when power may be provided from a power generation device that generates power by renewable energy such as solar power, hydraulic power, and wind power, and an amount of power that may be provided. In addition, the charge and discharge system included in this system charges regenerated power generated by renewable energy, and supplies power according to a request. The power supply and demand management device requests the charge and discharge system to supply power when renewable power is requested in a time zone in which power generation is not performed with renewable energy. The charge and discharge system supplies power according to a power demand.

SUMMARY

In an electric power network, power from a commercial electric power system and power derived from renewable energy are mixed to charge a storage battery. However, in the system of JP 2022-82194 A, the charge and discharge system is charged only with renewable energy, and the system does not support charging from a commercial electric power system. For this reason, there is a problem that a storage battery charged with both power from a commercial electric power system and power derived from renewable energy may not manage input of power derived from renewable energy. In addition, in order to suppress the load on the environment, power derived from renewable energy may be required when power is supplied from a charged storage battery. In order to respond to this demand, it is necessary to manage how much power derived from renewable energy supplied from the storage battery is supplied from the storage battery and how much the storage battery is charged as the power is supplied. However, the system of JP 2022-82194 A has a problem that it is not possible to manage how much power derived from renewable energy has been output out of power derived from a commercial electric power system and power derived from renewable energy.

There is a need for managing input and output of power derived from renewable energy for a power element that may be charged with both power from a commercial electric power system and power derived from renewable energy.

According to one aspect of the present disclosure, there is provided a power converter including: a power conversion unit connected to a DC bus to which a first power converter configured to convert and output power supplied from an electric power system and a second power converter configured to convert and output power supplied from a power generation device configured to generate power using renewable energy are connected, the power conversion unit being configured to convert power input from the bus, output the converted power to a power element capable of being charged and discharged, convert power input from the power element, and output the converted power to the bus; a measurement unit configured to measure an electrical characteristic value of each of power input from the bus to the power conversion unit and power output from the power conversion unit to the bus; a storage unit configured to store a first reference function in which a target electrical characteristic value is defined according to the electrical characteristic value measured by the measurement unit, and a second reference function in which a target electrical characteristic value of the first power converter is defined according to an electrical characteristic value measured by the first power converter; a setting unit configured to set a power conversion characteristic of the power conversion unit based on an electrical characteristic value determined by the first reference function according to the electrical characteristic value measured by the measurement unit; and a management unit configured to manage, based on the electrical characteristic value measured by the measurement unit when power is supplied from the bus to the power conversion unit and the second reference function, a renewable energy charge amount that is a charge amount to the power element by power derived from renewable energy supplied from the second power converter to the power conversion unit, and manage, based on the electrical characteristic value measured by the measurement unit when power is supplied from the power element charged with power derived from renewable energy to the bus via the power conversion unit and the renewable energy charge amount, an amount of power derived from renewable energy supplied from the power element.

According to another aspect of the present disclosure, there is provided a power system including: a first power converter configured to convert and output power supplied from an electric power system; a second power converter configured to convert and output power supplied from a power generation device configured to generate power using renewable energy; a DC bus to which the first power converter and the second power converter are connected; and a power converter including: a power conversion unit connected to the bus and configured to convert power input from the bus, output the converted power to a power element capable of being charged and discharged, convert power input from the power element and output the converted power to the bus; a measurement unit configured to measure an electrical characteristic value of each of power input from the bus to the power conversion unit and power output from the power conversion unit to the bus; a storage unit configured to store a first reference function in which a target electrical characteristic value is defined according to the electrical characteristic value measured by the measurement unit, and a second reference function in which a target electrical characteristic value of the first power converter is defined according to an electrical characteristic value measured by the first power converter; a setting unit configured to set a power conversion characteristic of the power conversion unit based on an electrical characteristic value determined by the first reference function according to the electrical characteristic value measured by the measurement unit; and a management unit configured to manage, based on the electrical characteristic value measured by the measurement unit when power is supplied from the bus to the power conversion unit and the second reference function, a renewable energy charge amount that is a charge amount to the power element by power derived from renewable energy supplied from the second power converter to the power conversion unit, and manage, based on the electrical characteristic value measured by the measurement unit when power is supplied from the power element charged with power derived from renewable energy to the bus via the power conversion unit and the renewable energy charge amount, an amount of power derived from renewable energy supplied from the power element.

According to still another aspect of the present disclosure, there is provided a method for controlling a power converter including a power conversion unit connected to a DC bus to which a first power converter configured to convert and output power supplied from an electric power system and a second power converter configured to convert and output power supplied from a power generation device configured to generate power using renewable energy are connected, convert power input from the bus to output the converted power to a power element capable of being charged and discharged, and convert power input from the power element to output the converted power to the bus, the method including: a measurement step of measuring an electrical characteristic value of each of power input from the bus to the power conversion unit and power output from the power conversion unit to the bus; a setting step of setting a power conversion characteristic of the power conversion unit based on an electrical characteristic value determined by a first reference function in which a target electrical characteristic value is defined according to the electrical characteristic value measured in the measurement step; and a management step of managing a renewable energy charge amount that is a charge amount to the power element by power derived from renewable energy supplied from the second power converter to the power conversion unit based on the electrical characteristic value measured in the measurement step when power is supplied from the bus to the power conversion unit and a second reference function in which a target electrical characteristic value of the first power converter is defined according to an electrical characteristic value measured by the first power converter, and managing an amount of power derived from renewable energy supplied from the power element based on the electrical characteristic value measured in the measurement step when power is supplied from the power element charged with power derived from renewable energy to the bus via the power conversion unit and the renewable energy charge amount.

DETAILED DESCRIPTION

Figure 1:
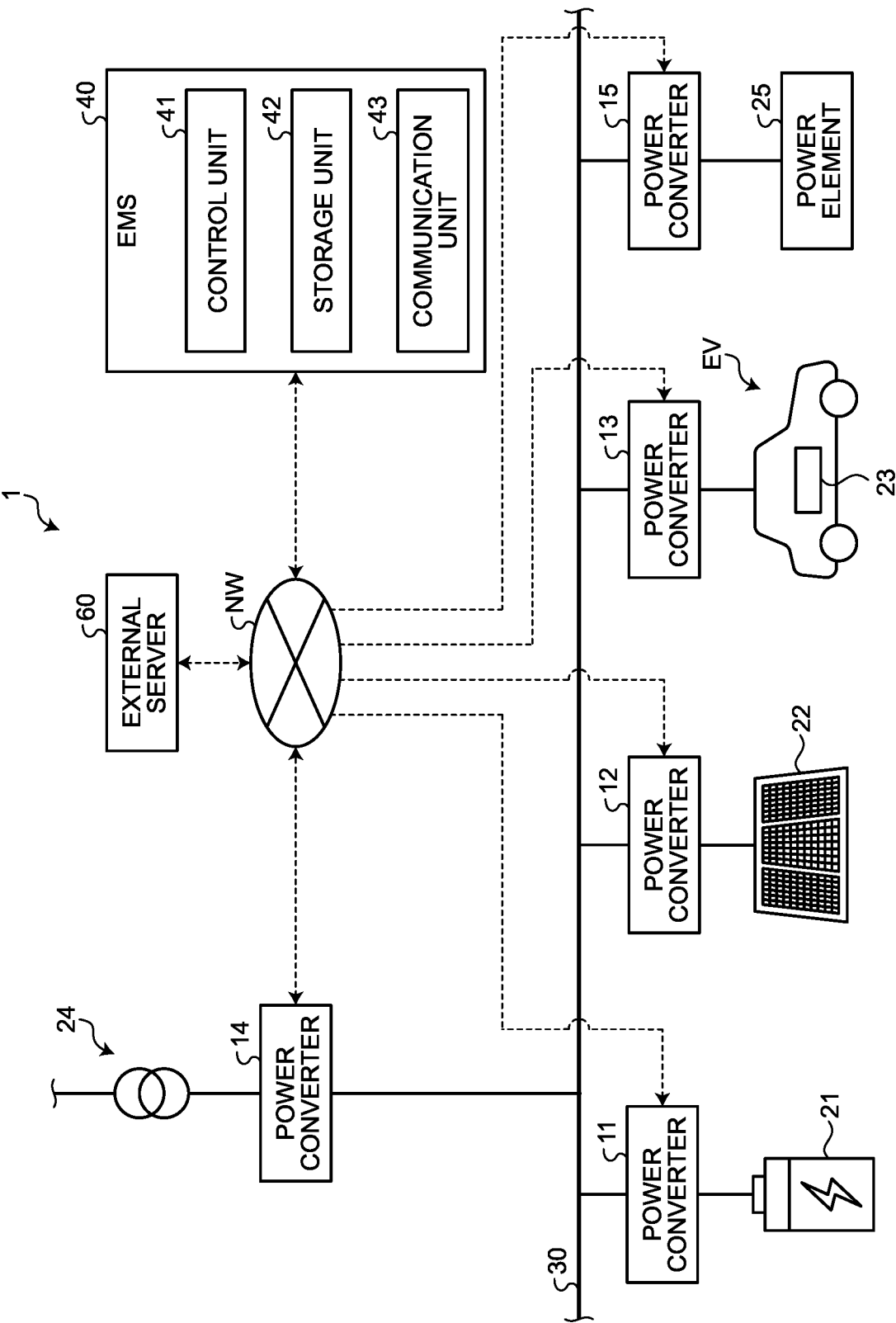
FIG. 1 is a diagram illustrating a configuration of a power system according to the embodiment.

Hereinafter, embodiments will be described with reference to the drawings. The present disclosure is not limited to the embodiments described below. Furthermore, in the description of the drawings, the same portions are appropriately denoted by the same reference numerals.

FIG. 1 is a diagram illustrating a configuration of a power system according to the embodiment. The power system 1 is a system capable of charging a storage battery with power from a commercial electric power system and power derived from renewable energy and supplying power from the charged storage battery. The power system 1 manages charging with power from a commercial electric power system and charging with power derived from renewable energy when charging a storage battery, and manages power supply derived from renewable energy and power supply derived from the commercial electric power system when supplying power from the storage battery. The power system 1 includes power converters 11 to 15, power elements 21 to 25, and a bus 30. Further, the power system 1 includes an energy management system (EMS) 40. The EMS 40 is an example of a central control device.

The bus 30 is a DC bus in the power system 1, and is connected to the power converters 11 to 15. In the power system 1, an electric power network including a DC grid including the bus 30, the power converters 11 to 15, and the power elements 21 to 25 is configured.

The power converters 11 to 13 and 15 are DC/DC converters that convert a DC voltage. The power converter 14 is an AC/DC converter that performs conversion between a DC voltage and an AC voltage. The configuration and function of the power converters 11 to 15 will be described in detail later.

The power element 21 is, for example, a stationary electrical storage device capable of being charged and discharged, and is connected to the power converter 11. The stationary electrical storage device is an example of an in-facility electrical storage device which is permanently installed. The power converter 11 has a function of converting the voltage of the DC power supplied by the power element 21 and outputting the converted voltage to the bus 30, and converting the voltage of the DC power supplied from the bus 30 and outputting the converted voltage to the power element 21 and charging the power element 21. The power converter 11 has a function of performing information communication in a wired or wireless manner. The power converter 11 communicates with the EMS 40, and controls input/output to/from the bus 30 based on the reference function transmitted from the EMS 40 and stored.

The power element 22 is, for example, a photovoltaic power generation device capable of generating and supplying electric power, and is connected to the power converter 12. The photovoltaic power generation device is an example of a power generation device that generates power using renewable energy. The power converter 12 has a function of converting the voltage of the DC power supplied by the power element 22 and outputting the converted voltage to the bus 30. The power converter 12 is an example of a second power converter. The power converter 12 has a function of performing information communication in a wired or wireless manner. The power converter 12 communicates with the EMS 40 and controls the output to the bus 30 based on the reference function transmitted from the EMS 40 and stored. Note that the power element 22 is not limited to a photovoltaic power generation device, and may be a power generation device that generates power using renewable energy such as a power generation device using hydraulic power or a power generation device using wind power.

The power element 23 is, for example, an in-vehicle electrical storage device capable of supplying power and being charged, and is connected to the power converter 13. The power element 23 is mounted on the electric vehicle EV, and is an example of a moving non-stationary electrical storage device. The power converter 13 has a function of converting the voltage of the DC power supplied by the power element 23 and outputting the converted voltage to the bus 30, and converting the voltage of the DC power supplied from the bus 30 and outputting the converted voltage to the power element 23 to charge the power element. The power converter 13 is an example of a third power converter. The power converter 13 is provided in, for example, a charging station of an electric vehicle or a residential charging facility, but may be mounted on an electric vehicle EV. The power converter 13 has a function of performing information communication in a wired or wireless manner. The power converter 13 communicates with the EMS 40, and controls input/output to/from the bus 30 based on the reference function transmitted from the EMS 40 and stored.

The power element 24 is, for example, a commercial electric power system, and is connected to the power converter 14. The power converter 14 converts AC power supplied from the power element 24 into DC power to output the DC power to the bus 30, and converts DC power supplied from the bus 30 into AC power to output the AC power to the power element 24. The power converter 14 is an example of a first power converter. The output of power from the bus 30 to the power element 24 is also referred to as a reverse power flow. The power converter 14 has a function of performing information communication in a wired or wireless manner. The power converter 14 communicates with the EMS 40, and controls input/output to/from the bus 30 based on the reference function transmitted from the EMS 40 and stored.

The power element 25 is a device that consumes power, for example, a device that converts power into kinetic energy or thermal energy. The power converter 15 has a function of converting a voltage of DC power supplied from the bus 30 and outputting the converted voltage to the power element 25 to operate the power element 25. The power converter 15 is also an example of a third power converter. The power converter 15 has a function of performing information communication in a wired or wireless manner. The power converter 15 communicates with the EMS 40 and controls the output to the power element 25 based on the reference function transmitted from the EMS 40 and stored.

The EMS 40 has a function of integrally managing the state of the power system 1. The EMS 40 includes a control unit 41, a storage unit 42, and a communication unit 43.

The control unit 41 performs various types of arithmetic processing for realizing the functions of the EMS 40, and includes, for example, a processor such as a central processing unit (CPU), an application specific integrated circuit (ASIC), a field-programmable gate array (FPGA), a digital signal processor (DSP), or a graphics processing unit (GPU). The functions of the control unit 41 are implemented as functional units by the control unit 41 reading and executing various programs from the storage unit 42.

The storage unit 42 includes, for example, a read only memory (ROM) that stores various programs, data, and the like used by the control unit 41 to perform arithmetic processing. Furthermore, the storage unit 42 includes, for example, a random access memory (RAM) used for storing a work space when the control unit 41 performs arithmetic processing, a result of the arithmetic processing of the control unit 41, and the like. The storage unit 42 may include an auxiliary storage device such as a hard disk drive (HDD) or a solid state drive (SSD).

The communication unit 43 includes a communication module that performs information communication in a wired or wireless manner. The communication unit 43 performs information communication with the power converters 11 to 15 and an external server 60 via a network NW including an Internet line network, a mobile phone line network, and the like.

Note that the external server 60 is a server provided outside the power system 1. For example, the external server 60 is an information processing device configured to function as an EMS in another power system, or an information processing device that includes a database and functions as a data server with respect to the EMS 40. The external server 60 stores various types of information that may affect the operation of the power system 1.

Figure 2:
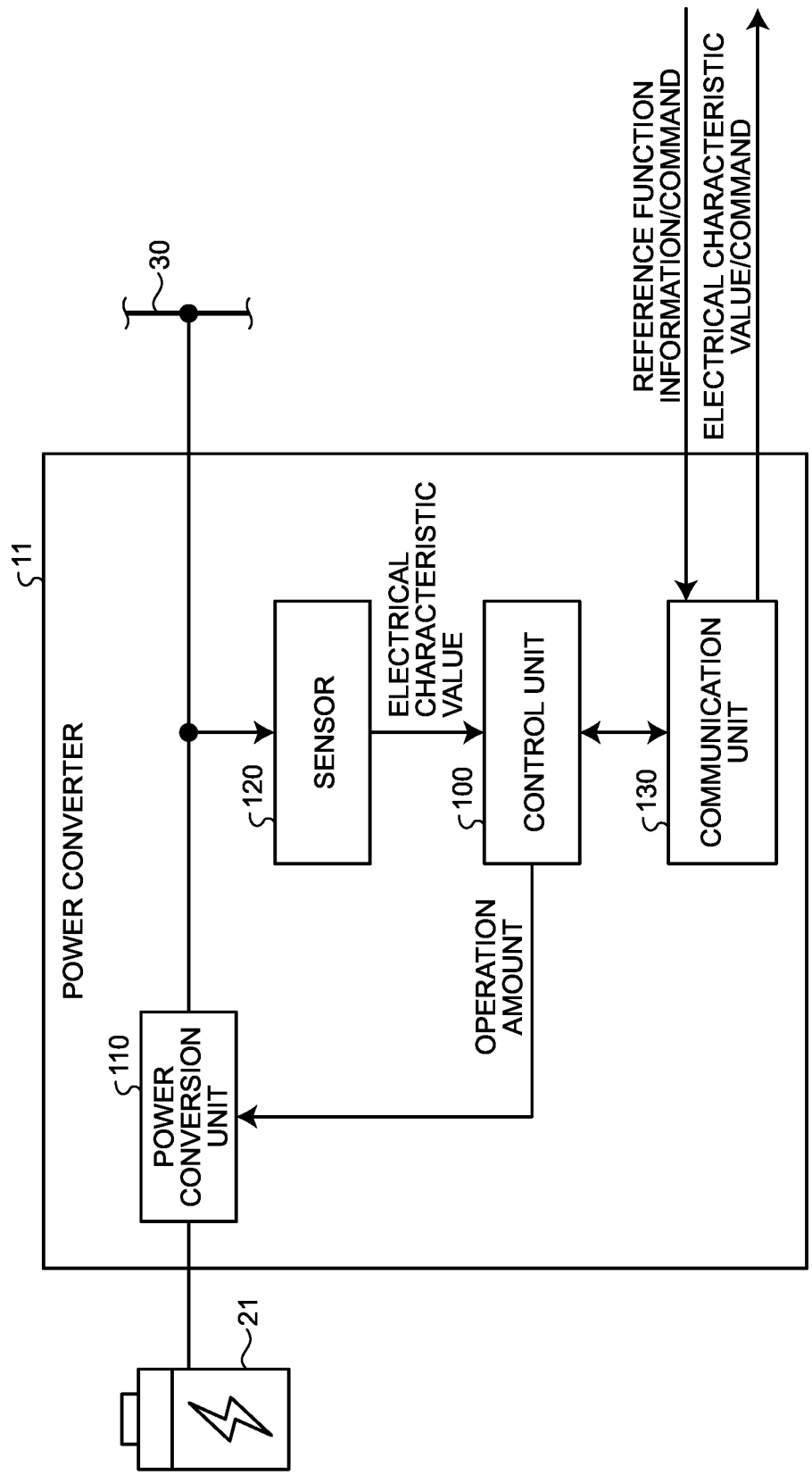
FIG. 2 is a diagram illustrating a configuration of a power converter.

Next, a specific configuration of the power converter 11 will be described. FIG. 2 is a diagram illustrating a configuration of the power converter 11. The power converter 11 includes a control unit 100, a power conversion unit 110, a sensor 120, and a communication unit 130.

The power conversion unit 110 performs a DC/DC conversion for converting a voltage of DC power input from the discharging power element 21 and outputting the converted voltage to the bus 30. The power conversion unit 110 may also convert a voltage of DC power input from the bus 30 to output the converted voltage to the power element 21 to charge the power element 21. The power conversion unit 110 includes an electric circuit including, for example, a coil, a capacitor, a diode, a switching element, and the like. The switching element is, for example, a field effect transistor or an insulated gate bipolar transistor. The power conversion unit 110 may control power conversion characteristics by, for example, pulse width modulation (PWM) control.

The sensor 120 measures an electrical characteristic value of power on the bus 30 side of the power conversion unit 110. The sensor 120 is an example of a measurement unit. Therefore, the sensor 120 measures an electrical characteristic value of the power input to the power converter 11 or output from the power converter 11. The sensor 120 may measure a current value, a voltage value, a power value, and the like as the electrical characteristic value. The sensor 120 outputs the measured electrical characteristic value to the control unit 100.

The communication unit 130 includes a communication module that performs information communication in a wired or wireless manner. The communication unit 130 performs information communication with the power converters 12 to 15 and the EMS 40 via the network NW. For example, the communication unit 130 receives a command transmitted from the EMS 40 and a command transmitted from the power converters 12 to 15, outputs the command to the control unit 100 to transmit the command output from the control unit 100 to the power converters 12 to 15. The command transmitted from the EMS 40 includes reference function information. The reference function information will be described later. In addition, the communication unit 130 transmits, for example, information about the power status input from the control unit 100 to the EMS 40. Note that, in a case where the information about the power status is the measurement value of the sensor 120, the communication unit 130 may transmit, for example, the electrical characteristic value input from the sensor 120 to the EMS 40.

Figure 3:
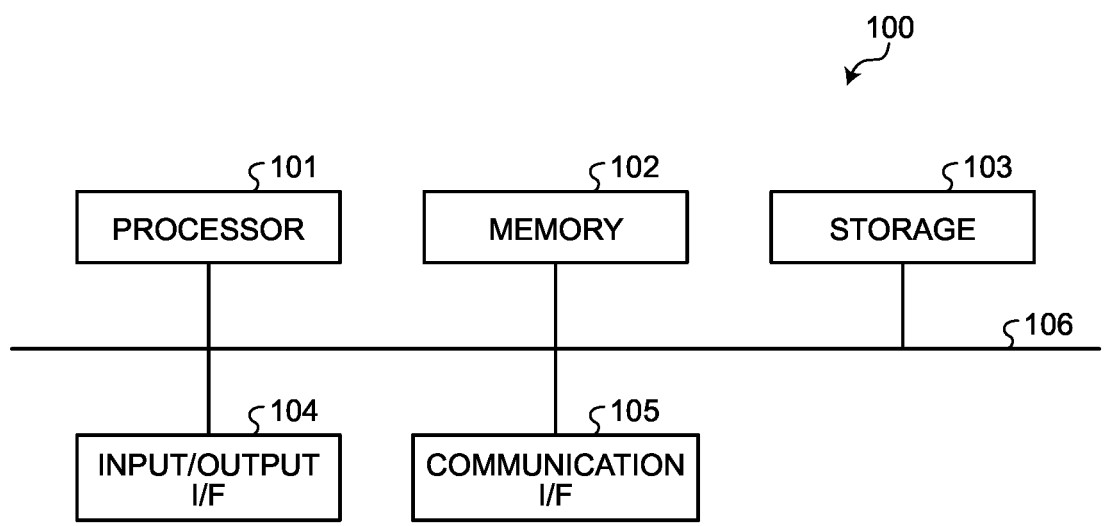
FIG. 3 is a diagram illustrating a configuration of a control unit of a power converter.

FIG. 3 is a block diagram illustrating a configuration of the control unit 100. The control unit 100 is configured by connecting a processor 101, a memory 102, a storage 103, an input/output I/F 104, and a communication I/F 105 to a bus 106. The memory 102 is, for example, a RAM, and includes a volatile memory or a nonvolatile memory. The memory 102 serves as a work space when the processor 101 performs arithmetic processing, and stores a result of the arithmetic processing of the processor and the like. The storage 103 includes a ROM and an auxiliary storage device such as an HDD or an SSD. The storage 103 stores programs and data used by the processor 101 to perform arithmetic processing. In addition, the storage 103 stores the reference function information received by the communication unit 130. The storage 103 is an example of a storage unit. The input/output I/F 104 is connected to the power conversion unit 110 and is controlled by the processor 101 to output a signal for controlling the power conversion unit 110. The input/output I/F 104 is connected to the sensor 120, and acquires an electrical characteristic value output from the sensor 120 to output the electrical characteristic value to the processor 101. The communication I/F 105 is connected to the communication unit 130 and controls the communication unit 130. The processor 101 is, for example, a CPU, reads a program from the storage 103, and executes the program with the memory 102 as a work space. The processor 101 may be an ASIC, an FPGA, a DSP, or a GPU. The function of the power converter 11 is realized by the processor 101 executing the program.

Figure 4:
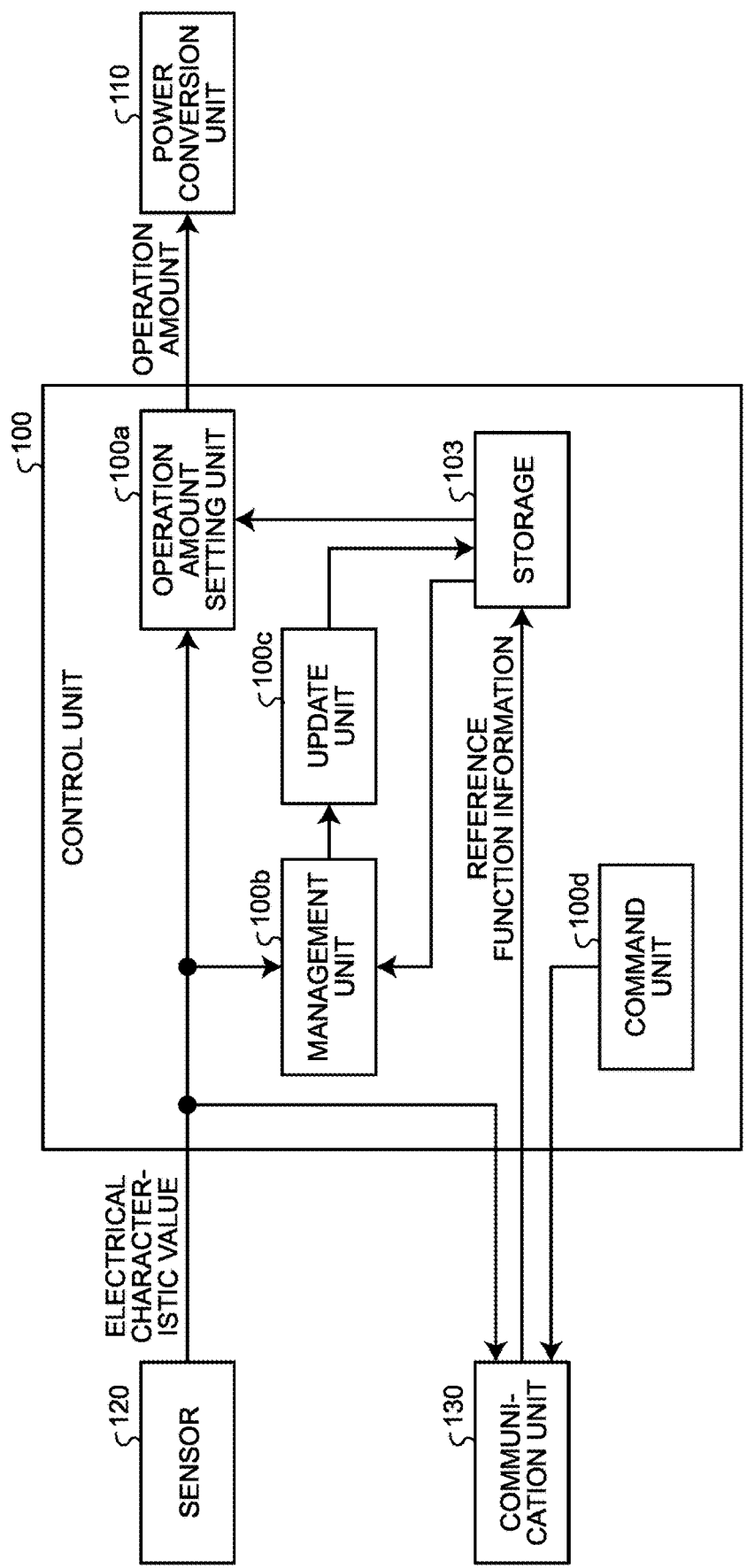
FIG. 4 is a diagram illustrating a configuration of a functional unit of a power converter.

FIG. 4 is a diagram illustrating a functional unit according to the present disclosure realized in the control unit 100. The control unit 100 includes an operation amount setting unit 100a, a management unit 100b, an update unit 100c, and a command unit 100d, which are functional units implemented as software by execution of a program.

The operation amount setting unit 100a sets a target value of the output of the power conversion unit 110 based on the electrical characteristic value measured by the sensor 120 and the reference function information stored in the storage 103. The operation amount setting unit 100a is an example of a setting unit. The target value is an electrical characteristic value, for example, a voltage value or a power value. In addition, the operation amount setting unit 100a performs feedback control of setting an operation amount (for example, the duty ratio) for PWM control so that a difference between the electrical characteristic value measured by the sensor 120 and the set target value falls within a predetermined range. The feedback control performed by the operation amount setting unit 100a may be executed using a known method such as PID control executed by reading parameters such as a proportional gain, an integral time, and a differential time stored in the storage 103 in advance. The operation amount setting unit 100a outputs information about the set operation amount to the power conversion unit 110 and controls the power conversion unit 110.

The management unit 100b manages the charge amount (renewable energy charge amount) of power derived from renewable energy with respect to the power element connected to the power conversion unit 110. The update unit 100c updates the reference function used for control of the power conversion unit 110 according to the renewable energy charge amount. The command unit 100d transmits a command for making a request to another power converter to another power converter via the communication unit 130.

Note that the other power converters 12, 13, 14, and 15 may have the same configuration as the power converter 11. However, the power conversion unit 110 of the power converter 14 performs AC/DC conversion of converting AC power supplied from the power element 24 into DC power and outputting the DC power to the bus 30, and DC/AC conversion of converting DC power supplied from the bus 30 into AC power and outputting the AC power to the power element 24.

Figure 5:
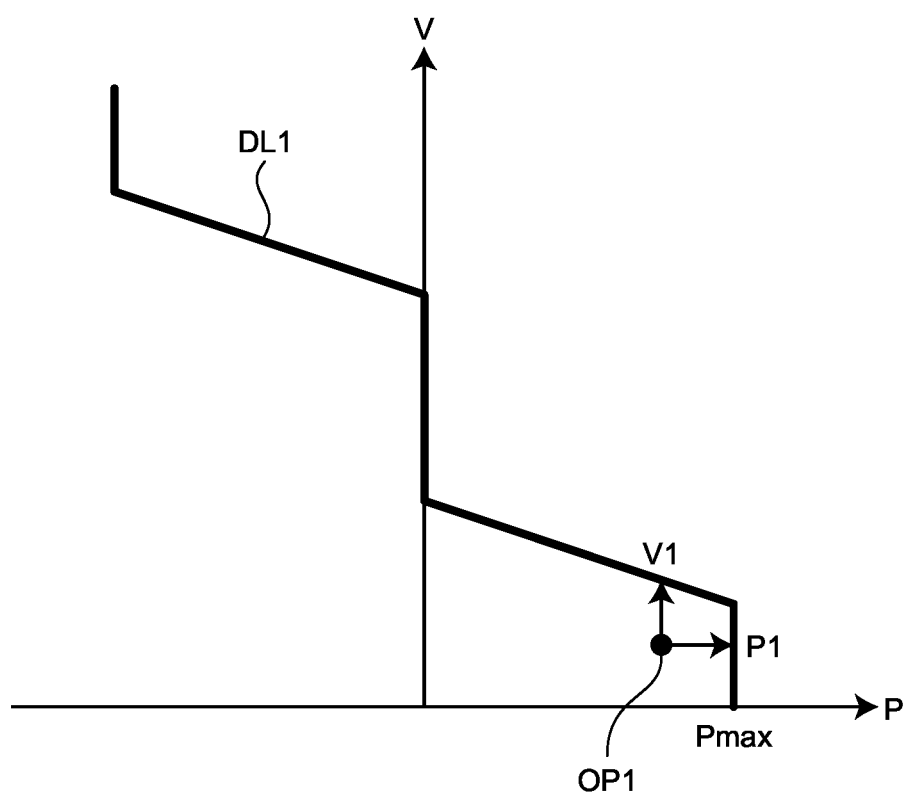
FIG. 5 is a diagram illustrating an example of a reference function.

Next, a reference function based on which the control unit 100 controls the power conversion characteristic of the power conversion unit 110 will be described. FIG. 5 is a diagram illustrating an example of the reference function indicated by the reference function information. The reference function information is various types of information for identifying the droop function constituting the reference function. In FIG. 5, the vertical axis represents voltage V, and the horizontal axis represents power P. The reference function illustrated in FIG. 5 indicates the V-P characteristic that is the relationship between the power P and the voltage V on the bus 30 side of the power conversion unit 110 included in the power converter 11, and indicates the power conversion characteristic of the power conversion unit 110. Note that the power P is a positive value in a case where the power conversion unit 110 supplies power to the bus 30, that is, the power element 21 is in the discharging state, and is a negative value in a case where the power is supplied from the bus 30, that is, the power element 21 is in the charging state. In addition, the state where the power P=0 is a state where neither charging nor discharging is performed.

The reference function represented by the line DL1 bent in the middle illustrated in FIG. 5 is configured by connecting a plurality of droop functions having different drooping characteristics, the function being defined according to the section of the input value. Specifically, the line DL1 is configured by connecting five droop functions having different drooping characteristics, and is identified by the reference function information. The reference function information includes, for example, coordinate information about a boundary of the droop function in coordinates where a horizontal axis is P and a vertical axis is V, intercept information about the droop function, information about an inclination (that is, a drooping coefficient), and information about a shape (straight line, curve, etc.).

The control unit 100 of the power converter 11 controls the power conversion characteristic of the power converter 11 to be a characteristic of a reference function indicated by the line DL1. That is, the control unit 100 of the power converter 11 controls the power conversion unit 110 so that the operating point defined by the value of the voltage V and the value of the power P, which are the electrical characteristic values on the bus 30 side of the power conversion unit 110, is located on the line DL1.

Note that control methods executed by the control unit 100 include droopP control and droopV control. The droopP control is a control method in which a target power value that is a target value is determined based on a voltage value that is an electrical characteristic value measured by the sensor 120 and a reference function, and a difference between a measurement value of power by the sensor 120 and the target power value is set to be equal to or less than an allowable range. The droopV control is a control method in which a target voltage value that is a target value is determined based on a power value that is an electrical characteristic value measured by the sensor 120 and a reference function, and a difference between the measurement value of the voltage by the sensor 120 and the target voltage value is set to be equal to or less than an allowable range.

Next, a method of controlling the power converters 11 to 15 and a method of controlling the power system 1 will be described. In the power system 1, so-called local control in which the power converters 11 to 15 individually performs control in an autonomously dispersion manner, and centralized control in which the EMS 40 cooperatively controls the power converters 11 to 15 according to the power status of the power system 1 may be executed. Note that, for example, the local control is repeatedly executed at a relatively short period, and the centralized control is executed at an interval longer than the period of the local control. The local control is also referred to as primary control, and the centralized control is also referred to as secondary control. These control methods are executed by a processor executing a program in each power converter or the EMS 40, for example.

First, the centralized control will be described. In the following example, the EMS 40 executes centralized control by updating the reference function information used in the power converters 11 to 15 by a command. Updating the reference function information by the command means that the command includes the reference function information related to the reference function, and part or the whole of the reference function is updated by the command. The storage 103 of each of the power converters 11 to 15 stores the reference function information in an updatable manner.

For example, in the information communication between the EMS 40 and the power converters 11 to 15, the reference function information is included in the update command for updating the reference function. The reference function information used for this update is stored in the storage unit 42 of the EMS 40, and is appropriately read and used by the control unit 41.

Figure 6:
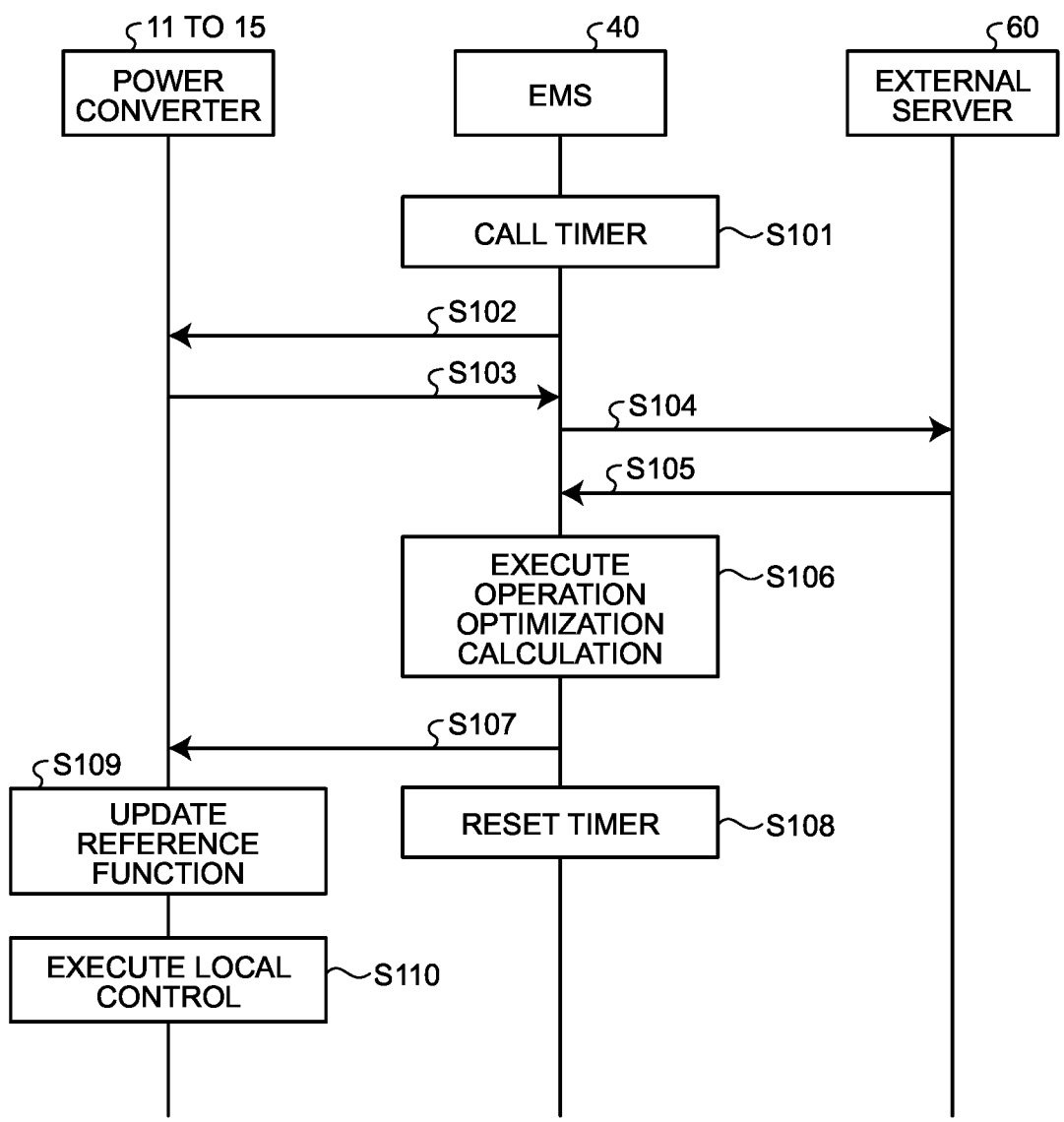
FIG. 6 is a sequence diagram illustrating an example of a method of controlling a power system.

Next, an example of a method of controlling the power system 1 by centralized control will be described with reference to a sequence diagram of FIG. 6. First, the EMS 40 calls a timer of the EMS 40 and starts clocking (step S101). Next, the EMS 40 requests the local measurement information from each of the power converters 11 to 15 (step S102). The local measurement information is an example of information about the power status of the power system 1, and includes the electrical characteristic value measured by the sensor 120 of each of the power converters 11 to 15 and the measurement time of the electrical characteristic value.

Next, the power converters 11 to 15 transmits the acquired local measurement information to the EMS 40 (step S103). The EMS 40 stores the local measurement information in the storage unit 42. Next, as an example of the information about the power status of the power system 1, the EMS 40 requests the external server 60 for various types of information that may affect the operation of the power system 1 (step S104). In this example, the EMS 40 requests an external server 60 for the power generation amount/demand prediction information. The power generation amount/demand prediction information includes prediction information about a power generation amount in the power system 1 and demand prediction information about electric power, and may include, for example, information such as a season of an area where the power system 1 is installed, current weather, and future weather forecast. In addition, in a case where the external server 60 functions as the EMS of another power system, when there is a possibility that the operation state of the another power system affects the operation of the power system 1, the power generation amount/demand prediction information may include prediction information of the power generation amount and demand prediction information of power in the another power system. Next, the external server 60 transmits the power generation amount/demand prediction information to the EMS 40 (step S105). The EMS 40 stores the power generation amount/demand prediction information in the storage unit 42.

Next, the control unit 41 of the EMS 40 reads each piece of transmitted information, that is, information about the power status of the power system 1, and the like from the storage unit 42, and executes operation optimization calculation of the power system 1 based on the information (step S106). The operation optimization calculation is executed to apply to various conditions. For example, it is assumed that the power system 1 is controlled so that the bus 30 is an operating point of a predetermined voltage. In this state, it is assumed that the EMS 40 determines, based on the power generation amount/demand prediction information, that the future weather of the area where the power element 22 that is a photovoltaic power generation device is installed is fine and the power generation amount is expected to increase, and that the power element 22 has a margin in terms of power supply from the local measurement information acquired from the power converter 12 connected to the power element 22. In this case, the EMS 40 determines to update the reference function of the power converter 11 connected to the power element 21 so that the power element 21, which is a stationary electrical storage device, is charged at the operating point. In addition, at the same time as the update, the EMS 40 determines to update the reference function of the power converter 14 connected to the power element 24 so that power is not supplied from the power element 24 which is a commercial electric power system. In addition, the operation optimization calculation may also be set and executed under conditions from the viewpoint of not exceeding the contract power of the power element 24 which is a commercial electric power system or from the viewpoint of optimizing the electricity rate, such as peak cut and utilization of nighttime power.

Next, the EMS 40 sets reference function information suitable for the power converter to be updated among the power converters 11 to 15 based on the result of the operation optimization calculation to output an update command including the set reference function information (step S107). Next, the EMS 40 resets the timer (step S108). Next, the power converter to be updated among the power converters 11 to 15 acquires an update command of the reference function and updates the reference function information (step S109). The power converter that has completed the update of the reference function information executes local control (step S110).

Next, a method of controlling the power converters 11 to 15 in the local control will be described using the power converter 11 as an example. Note that, in the other power converters 12 to 15, a control method similar to that described below may be appropriately executed.

In the method of controlling the power converter 11, the control unit 100 executes a control step of controlling the power conversion characteristic of the power converter 11, that is, the power conversion characteristic of the power conversion unit 110 based on the electrical characteristic value and the reference function information. An example of content of this control step will be described more specifically with reference to the drawings.

Figure 7:
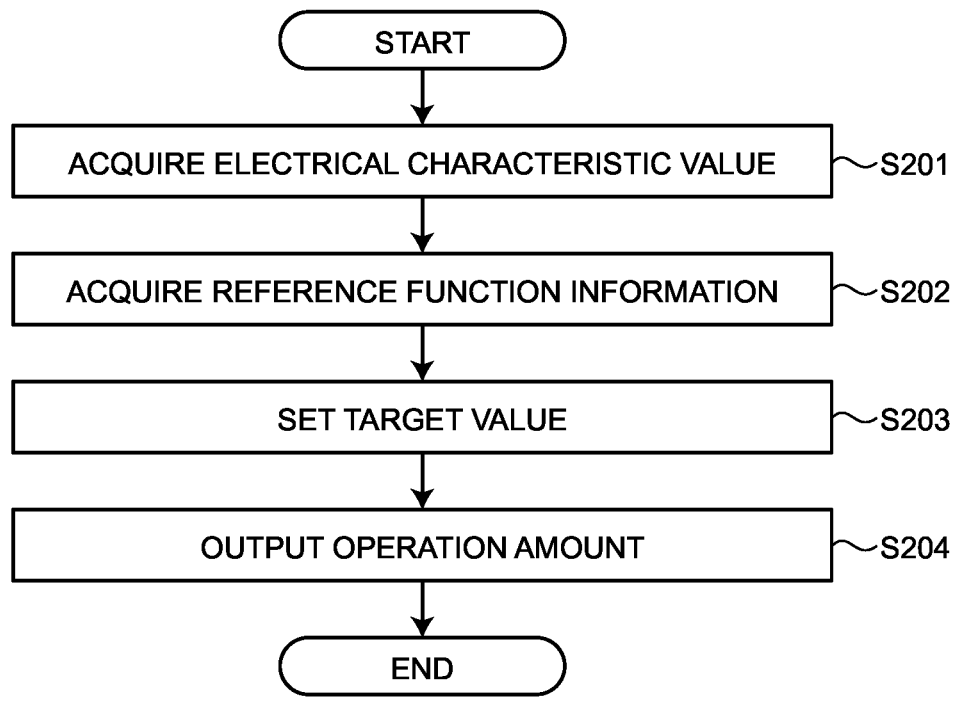
FIG. 7 is a flowchart illustrating a flow of a process performed by a control unit of the power converter.

FIG. 7 is a flowchart illustrating a flow of a process performed by the control unit 100. The control unit 100 executes the processing illustrated in FIG. 7 at a predetermined period, for example. First, the control unit 100 acquires the electrical characteristic value measured by the sensor 120 (step S201). Step S201 is an example of the measurement step. Next, the control unit 100 acquires the reference function information from the storage 103 (step S202).

Next, the control unit 100 sets a target value of the output of the power converter 11 (step S203). Step S203 is an example of a setting step. Here, when performing the droopP control, the control unit 100 sets, as a target value, a power value of a reference function that intersects when a line is drawn along the horizontal axis from the position of the operating point identified from the electrical characteristic value measured by the sensor 120. For example, in a case where the reference function is illustrated in FIG. 5 and the operating point is at the position of OP1 illustrated in FIG. 5 on the V-P characteristic, the control unit 100 sets, as the target value, the P1, which is a power value of the reference function that intersects when a line is drawn along the horizontal axis from the operating point. In addition, when performing the droopV control, the control unit 100 sets, as a target value, a voltage value of a reference function that intersects when a line is drawn along the vertical axis from the power value measured by the sensor 120. For example, in a case where the reference function is illustrated in FIG. 5 and the operating point is at the position of OP1 illustrated in FIG. 5 on the V-P characteristic, the control unit 100 sets, as the target value, the V1, which is the voltage value of the reference function intersecting when a line is drawn along the vertical axis from the operating point.

Next, the control unit 100 sets an operation amount for PWM control so that a difference between the electrical characteristic value measured by the sensor 120 and the target value set in step S203 falls within a predetermined range to output the set operation amount to the power conversion unit 110 (step S204). As a result, control of the power conversion unit 110 is executed.

In the present embodiment, the power converter 11 monitors the amount of power when the power element 21 is charged with power derived from renewable energy and the amount of power when the charged power derived from renewable energy is supplied from the power element 21 to the bus 30, and manages the charge amount (renewable energy charge amount) of the power element 21 with power derived from renewable energy. Hereinafter, a method of managing the renewable energy charge amount will be described. In the present embodiment, the charge amount of the power element 21 at the time point t is set as P(t) [Wh], and the renewable energy charge amount is set as $P_{RE}(t)$ [Wh]. In the present embodiment, the amount of power of input/output of the power element 21 from the time point t−1 to the time point t measured by the sensor 120 is set as $P_{IO}(t)$ [Wh]. Note that Pro (t) is positive when the power element 21 is charged and negative when the power element 21 is discharged.

First, a method of managing the $P_{RE}(t)$ at the time of charging the power element 21 will be described. Specifically, the control unit 100 of the power converter 11 acquires the reference function of the power converter 14 from the EMS 40 in advance and stores the reference function in the storage 103. The control unit 100 of the power converter 11 manages the $P_{RE}(t)$ using a reference function of the power converter 14 stored in advance in the storage 103.

Figure 8:
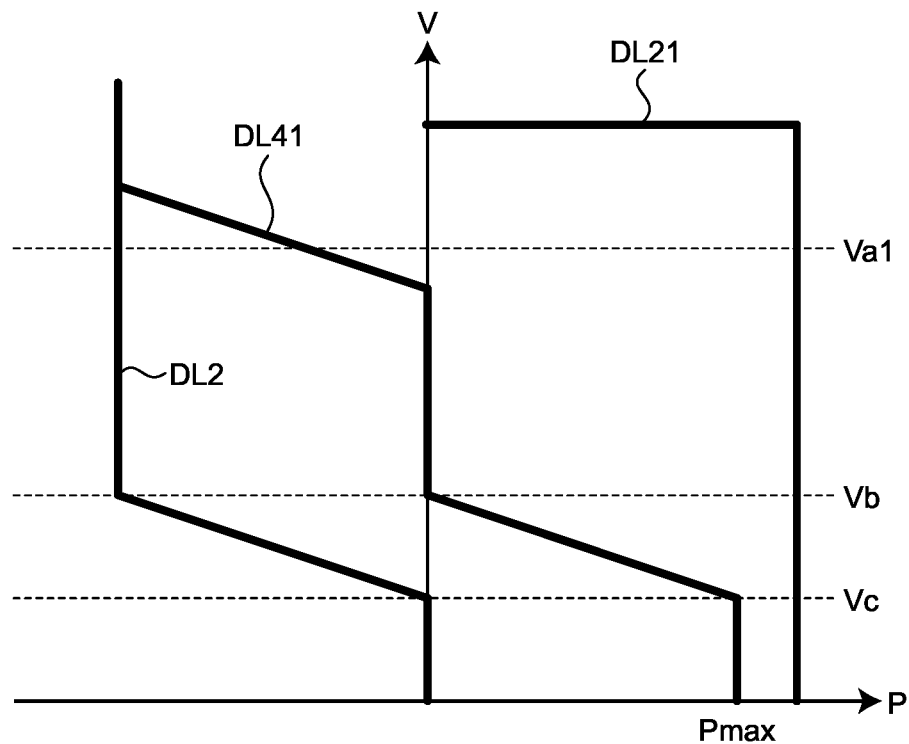
FIG. 8 is a diagram illustrating an example of a reference function.

For example, when the output of the power element 22 is large, the reference function of the power converter 11 is the line DL2, the reference function of the power converter 12 is the line DL21, and the reference function of the power converter 14 is the line DL41 by the centralized control as illustrated in FIG. 8. When the voltage of the bus 30 measured by the sensor 120 is Va1 illustrated in FIG. 8, the power P of the line DL2 is negative when the voltage is Va1, so that the power converter 11 charges the power element 21. Here, the control unit 100 of the power converter 11 determines how the power element 21 is being charged. When the control unit 100 of the power converter 11 refers to the line DL41, which is a reference function of the power converter 14 stored in the storage 103, the power P has a negative value when the voltage of the bus 30 is Va1. That is, in a case where the voltage of the bus 30 is Va1, it is determined that the power converter 14 does not output power to the bus 30 due to reverse power flow, and the power element 21 is charged only by the output from the power element 22. In this case, the control unit 100 of the power converter 11 calculates the renewable energy charge amount by calculating the following Expression (1). In addition, the control unit 100 of the power converter 11 records the calculated renewable energy charge amount in the storage 103 as a history together with the calculated date and time.

$$P_{RE}(t+1)=P_{RE}(t)+P_{IO}(t) \tag{1}$$

Figure 9:
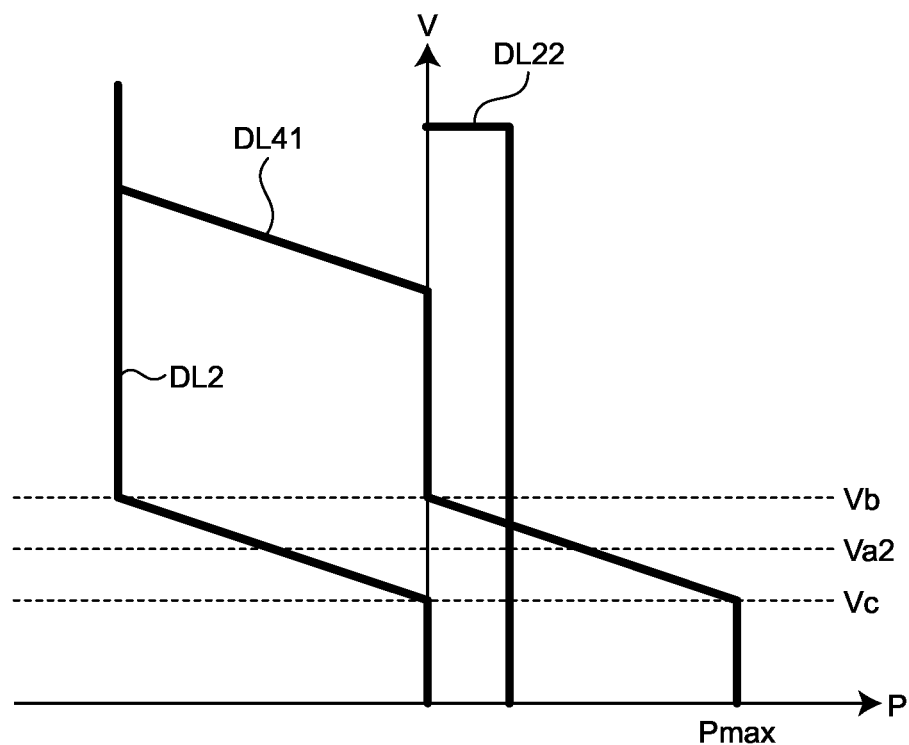
FIG. 9 is a diagram illustrating an example of a reference function.

Next, in a case where the output of the power element 22 is small, the reference function of the power converter 12 is the line DL22 by the centralized control as illustrated in FIG. 9. When the voltage of the bus 30 measured by the sensor 120 is Va2 illustrated in FIG. 9, the power P of the line DL2 is negative when the voltage is Va2, so that the power converter 11 charges the power element 21. Here, the control unit 100 of the power converter 11 determines how the power element 21 is being charged. When the control unit 100 of the power converter 11 refers to the line DL41, which is a reference function of the power converter 14 stored in the storage 103, the power P has a positive value when the voltage of the bus 30 is Va2. That is, when the voltage of the bus 30 is Va2, it is determined that the power converter 14 is outputting power to the bus 30 and the power element 21 is being charged by the output from the power element 22 and the output from the power element 24. In this case, the control unit 100 of the power converter 11 calculates the renewable energy charge amount by calculating the following Expression (2). In addition, the control unit 100 of the power converter 11 records the calculated renewable energy charge amount in the storage 103 as a history together with the calculated date and time.

$$P_{RE}(t+1)=P_{RE}(t)+P_{IO}(t)\times(2\times Va2-Vc-Vb)/(Va2-Vc) \quad (2)$$

Figure 10:
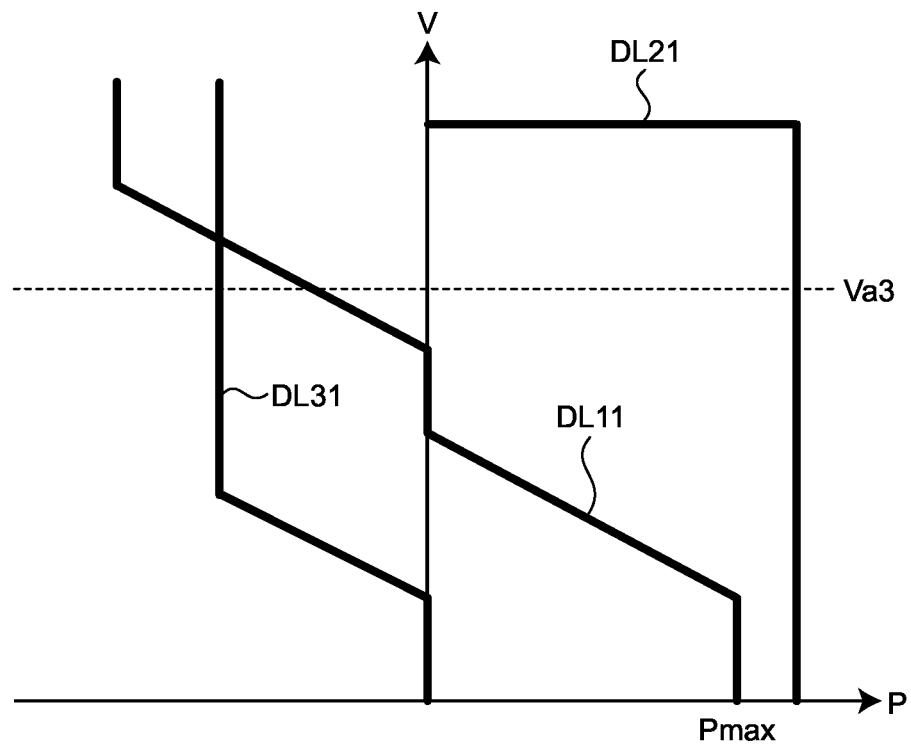
FIG. 10 is a diagram illustrating an example of a reference function.

Next, a method of managing $P_{RE}(t)$ when the power converter 13 requests power derived from renewable energy will be described. For example, when the output of the power element 22 is large, as illustrated in FIG. 10, the reference function of the power converter 11 is the line DL11, the reference function of the power converter 12 is the line DL21, and the reference function of the power converter 13 is the line DL31. When the voltage of the bus 30 measured by the sensor 120 is Va3 illustrated in FIG. 10, the power P of the line DL11 is negative when the voltage is Va3, so that the control unit 100 of the power converter 11 supplies power to the power element 21 to charge the power element 21. In this case, the control unit 100 of the power converter 11 performs calculation of Expression (1) described above. In addition, the control unit 100 of the power converter 11 records the calculated renewable energy charge amount in the storage 103 as a history together with the calculated date and time. The required power is supplied from the power element 21 to the power converter 13 that has requested power derived from renewable energy.

Figure 11:
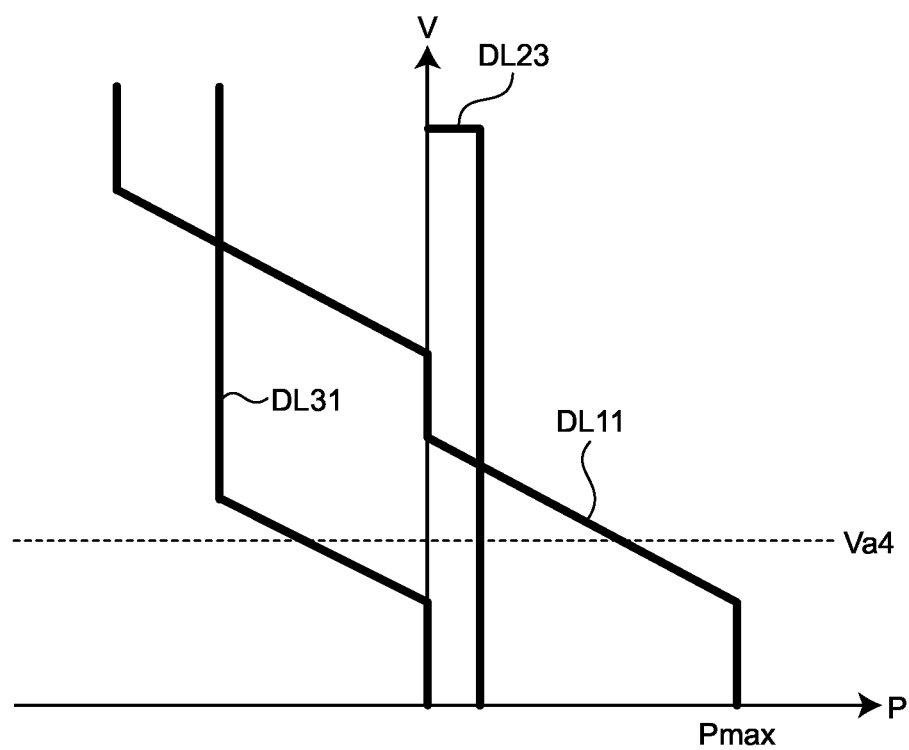
FIG. 11 is a diagram illustrating an example of a reference function.

Next, for example, in a case where the output of the power element 22 is small, as illustrated in FIG. 11, the reference function of the power converter 11 is the line DL11, the reference function of the power converter 12 is the line DL23, and the reference function of the power converter 13 is the line DL31. When the voltage of the bus 30 measured by the sensor 120 is Va4 illustrated in FIG. 11, the power P of the line DL11 is positive when the voltage is Va4, so that the control unit 100 of the power converter 11 supplies power from the power element 21 to the bus 30. In addition, the control unit 100 of the power converter 11 calculates the renewable energy charge amount by Expression (1). Here, since the power element 21 is supplying power and $P_{IO}(t)$ in Expression (1) is a negative value, the renewable energy charge amount decreases as the power supply continues. The control unit 100 of the power converter 11 records the calculated renewable energy charge amount in the storage 103 as a history together with the calculated date and time. When the power derived from the renewable energy is requested from the power converters 13 and 15 and $P_{RE}(t)$ =0, the control unit 100 of the power converter 11 calculates the charge amount of the power element 21 by calculating Expression (3).

$$P(t+1)=P(t)+P_{IO}(t) \quad (3)$$

In addition, in a case where power derived from renewable energy is not requested from the power converters 13 and 15 and P(t) is not 0, the control unit 100 of the power converter 11 performs the calculation of Expression (3). In a case where power derived from renewable energy is not requested from the power converters 13 and 15 and P(t)=0, the control unit 100 of the power converter 11 performs the calculation of Expression (1) and records the calculated renewable energy charge amount in the storage 103 as a history together with the calculated date and time.

Although the reference function of the power converter 15 is not illustrated in FIGS. 10 and 11, since the power element 25 is a device that consumes power, the reference function of the power converter 15 is a reference function similar to the line DL31.

Figure 12:
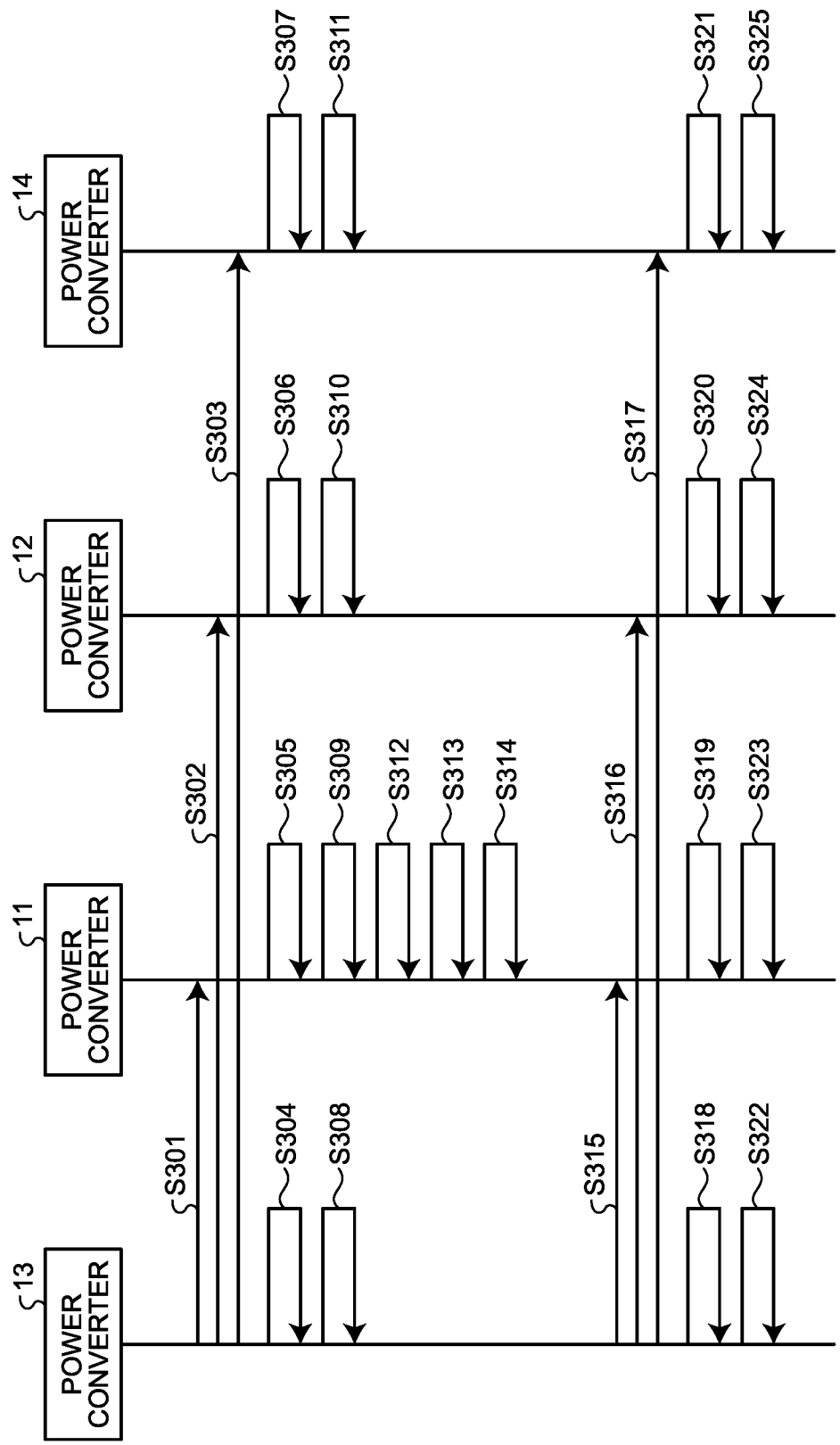
FIG. 12 is a sequence diagram illustrating an example of a method of controlling a power system.

Next, an operation example when power is supplied from the power element 21 charged with power derived from renewable energy will be described. FIG. 12 is a sequence diagram illustrating an example of a method of controlling the power system 1. For example, when charging the power element 23 with power derived from renewable energy, the power converter 13 transmits a request command for requesting power derived from renewable energy to the power converters 11, 12, and 14 (steps S301 to S303). Note that the power converter that transmits the request command is not limited to the power converter 13, and the power converter 15 may transmit the request command, or both the power converter 13 and the power converter 15 may transmit the request command. In addition, the request command may be transmitted by the EMS 40 instead of the power converter 13.

The power converter 13 that has transmitted the request command changes the reference function referred to in the local control to the reference function used when the supply of the power derived from the renewable energy is requested (step S304). Each of the power converters 11, 12, and 14 that has received this request command changes the reference function referred to in the local control to the reference function used when the supply of power derived from renewable energy is requested (steps S305 to S307). Subsequently, each of each of the power converters 11 to 14 starts local control using the changed reference function (steps S308 to S311). Note that the reference function when the supply of the power derived from the renewable energy is requested may be stored in the storage 103 in advance, or may be acquired from the EMS 40.

Next, the power converter 11 that has received the request command calculates the renewable energy charge amount by Expression (1) or Expression (2) according to the voltage of the bus 30 measured by the sensor 120, and records the calculated renewable energy charge amount in the storage 103 as a history (step S312). Step S312 is an example of a management step of managing the renewable energy charge amount. Subsequently, the power converter 11 updates the reference function according to the calculated renewable energy charge amount and the voltage of the bus 30 (step S313), and performs local control using the updated reference function (step S314).

Here, as illustrated in FIG. 10, when the output of the power element 22 is large and the voltage of the bus 30 is Va3, the power P of the line DL11 is negative when the voltage is Va3, so that the power converter 11 charges the power element 21, and the power element 23 is charged by the power converter 13 by the power supplied from the power element 22. In this case, Pro (t) is a positive value, and the renewable energy charge amount increases. In addition, as illustrated in FIG. 11, in a case where the output of the power element 22 is small and the voltage of the bus 30 is Va4, the power P of the line DL11 is positive when the voltage is Va4, so that the power converter 11 outputs the power supplied by the power element 21 to the bus 30. In this case, Pro (t) is a negative value, and the renewable energy charge amount decreases.

Figure 13:
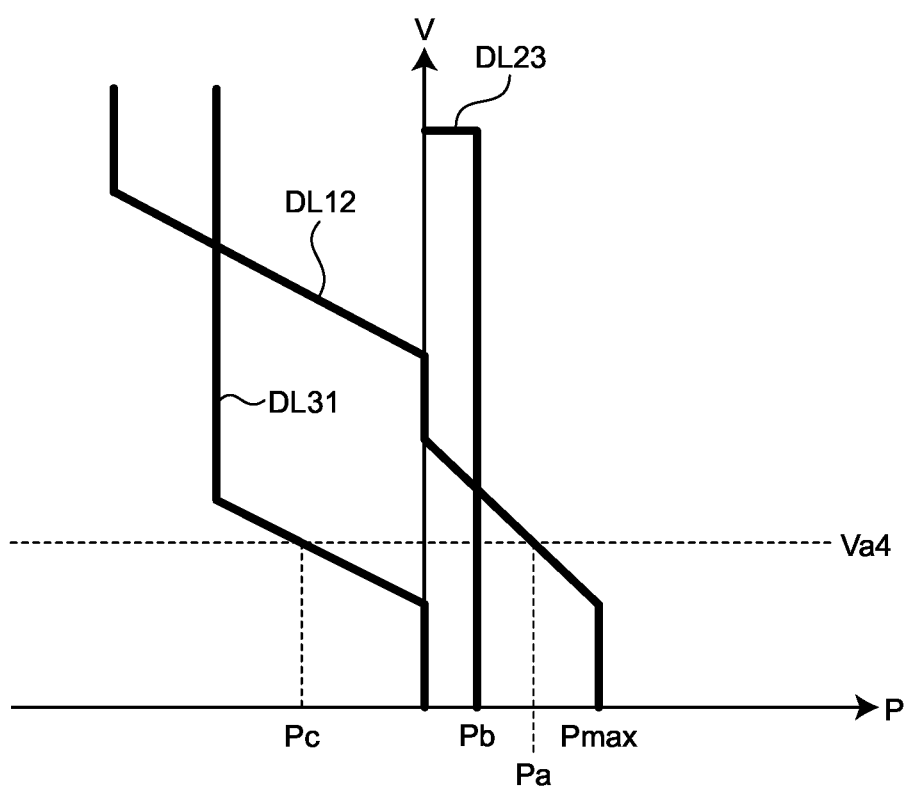
FIG. 13 is a diagram illustrating an example of a reference function.

The power converter 11 updates the reference function according to the calculated renewable energy charge amount. For example, the power converter 11 decreases Pmax, which is the maximum value of the output of the power P of the reference function, as the renewable energy charge amount decreases. As a result, the reference function of the power converter 11 is updated from the line DL11 to the line DL12 illustrated in FIG. 13, for example. In addition, in a case where the power element 21 is charged and the renewable energy charge amount increases, the power converter 11 increases the maximum value of the output of the power P of the reference function as the renewable energy charge amount increases. The power converter 11 updates Pmax to a modified reference function so that, for example, the output power Pa of the power element 21+the output power Pb of the power element 22=the power consumption Pc of the power element 23. When updating the reference function, the power converter 11 may communicate with the power converter 12 and the power converters 13 and 15 to acquire the reference function of each power converter.

Note that the line DL31 is a reference function that decreases the input power along with the voltage drop of the bus 30 in a case where the supply of power derived from renewable energy decreases and the voltage of the bus 30 drops at the time of charging the power element 23. In the power converter 13, when the voltage of the bus 30 is Va4, the power P required to charge the power element 23 also decreases according to the reference function of the line DL31 according to the decrease in the power supplied from the power element 21 and the power element 22, so that the supply of the power derived from the renewable energy may be continued even when the supply of the power derived from the renewable energy decreases. In addition, since the line DL31 is a reference function that stops charging by setting the input power to 0 when the supply of power derived from renewable energy decreases and the voltage of the bus 30 decreases, it is possible to prevent power other than power derived from renewable energy from being used although power derived from renewable energy is requested.

The power converter 11 repeats the processing of steps S312 to S314 until a stop command for instructing to stop power supply derived from renewable energy is transmitted from the power converter 13. In a case where stopping charging with power derived from renewable energy, the power converter 13 transmits a stop command to the power converters 11, 12, and 14 (steps S315 to S317). The power converter 13 that has transmitted the stop command changes the reference function referred to in the local control to a reference function used when the supply of power derived from renewable energy is not requested (step S318). Each of the power converters 11, 12, and 14 that has received this stop command changes the reference function referred to in the local control to the reference function when the supply of power derived from renewable energy is not requested (steps S319 to S321). Subsequently, each of the power converters 11 to 14 starts local control using the changed reference function (steps S322 to S325).

The power converter 11 manages a difference between the renewable energy charge amount at the time of receiving the request command and the renewable energy charge amount at the time of receiving the stop designation as the power amount of the power derived from the renewable energy supplied from the power element 21.

As described above, according to the present embodiment, for the power element 21 charged with both the power from the commercial electric power system and the power derived from the renewable energy, the amount of power at the time of charging with the power derived from the renewable energy and the amount of power at the time of outputting the power derived from the renewable energy are calculated as the renewable energy charge amount, and thus, it is possible to manage charging and discharging with the power derived from the renewable energy. In addition, in the present embodiment, since the calculated renewable energy charge amount is recorded together with the date and time as a history, input/output of power derived from renewable energy may be managed. In addition, according to the present embodiment, as compared with the configuration in which the EMS 40 acquires the amount of power of input/output of the power element 21 from the power converter 11 and calculates the renewable energy charge amount, the calculation of the renewable energy charge amount is performed without communication by the power converter 11 operating in an autonomous dispersion manner, and thus, it is possible to reduce the communication cost related to the management of the renewable energy charge amount. In addition, when receiving the request command, the power converter 11 itself updates the reference function according to the change in the renewable energy charge amount so that the supply of power derived from renewable energy may be continued, and thus, it is possible to satisfy the request for power derived from renewable energy in an autonomous dispersion manner.

Although the embodiments have been described above, the present disclosure is not limited to the above-described embodiments, and may be implemented in various other forms. For example, the present disclosure may be implemented by modifying the above-described embodiments as follows. Note that the above-described embodiments and the following modifications may be combined. The present disclosure also includes components configured by appropriately combining the components of the above-described embodiments and modifications. Further, further effects and modifications may be easily derived by those skilled in the art. Therefore, a wider aspect of the present disclosure is not limited to the above embodiments and modifications, and various modifications may be made.

In the above-described embodiments, since the power element 23 is an electrical storage device capable of supplying power and being charged, the power converter 13 may perform the same operation as the power converter 11 when receiving a request command to itself from another power converter.

In the above-described embodiments, the request command is transmitted from the power converter 13 to the power converters 11, 12, and 14, but the request command may be transmitted only from the power converter 13 to the power converter 11.

Figure 14:
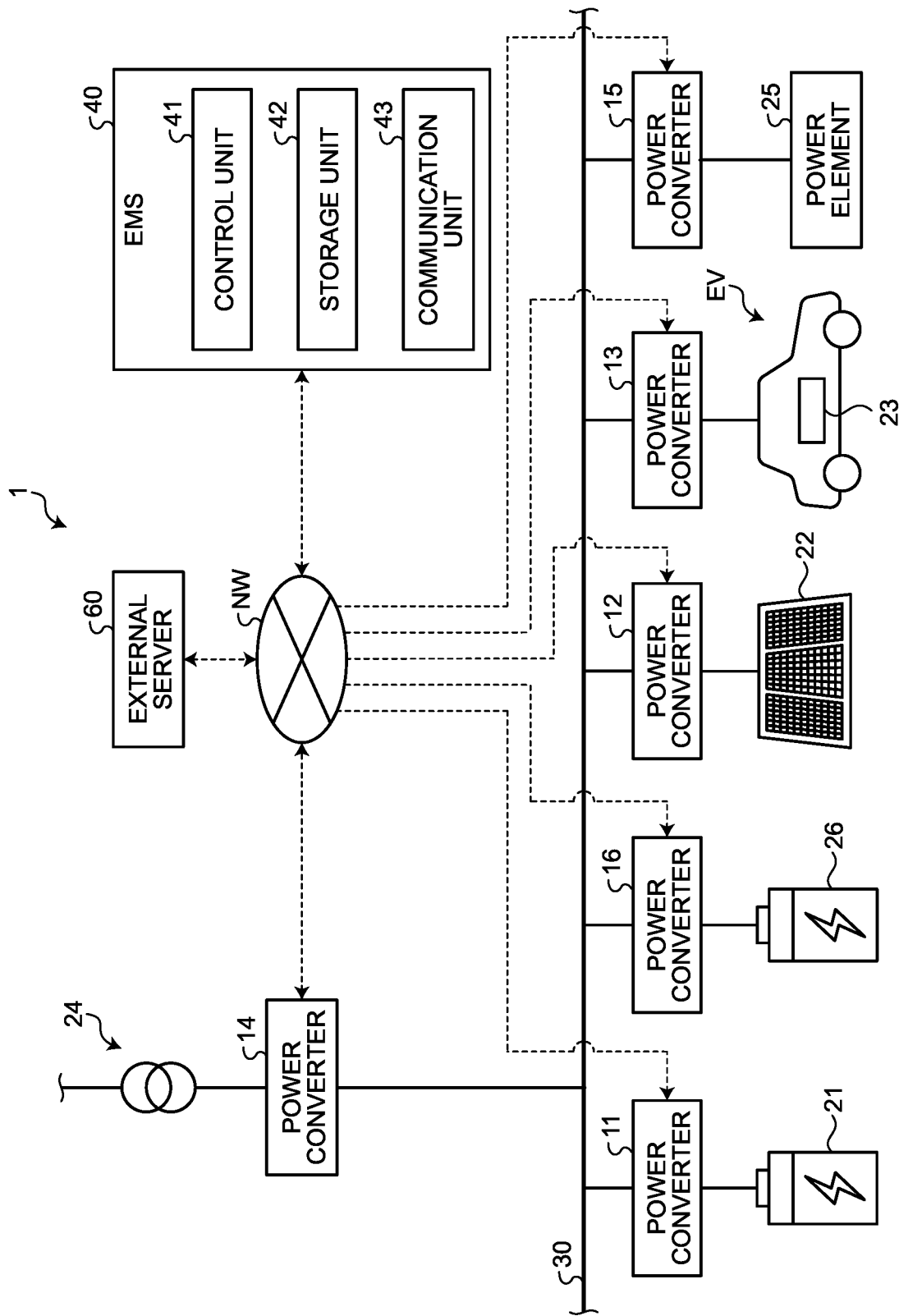
FIG. 14 is a diagram illustrating a configuration of a power system according to a modification.

FIG. 14 is a diagram illustrating the power system 1 to which the power converter 16 and the power element 26 are added. The power converter 16 has the same configuration as the power converter 11. Also, the power element 26 has the same configuration as the power element 21. In this case, the power converter 11 stores the reference function of the power converter 14 in addition to the reference function of the power converter 16. In addition, the power converter 16 stores a reference function of the power converter 14 and a reference function of the power converter 11.

In a case where the power system 1 includes the power converter 16 and the power element 21 in addition to the power converter 11 and the power element 26, the power converter 11 may manage the renewable energy charge amount by using the reference function of the power converter 14 in addition to the reference function of the power converter 11. In a case where the power system 1 includes the power converter 16 and the power element 26 and the output of the power element 22 is small, the reference function of the power converter 12 is the line DL22 by the centralized control as illustrated in FIG. 9. Note that the reference function of the power converter 11 and the reference function of the power converter 16 are the same on the line DL2. When the voltage of the bus 30 measured by the sensor 120 is Va2 illustrated in FIG. 9, the power P of the line DL2 is negative when the voltage is Va2, so that the power converter 11 charges the power element 21. In addition, when the voltage of the bus 30 measured by the sensor 120 is Va2 illustrated in FIG. 9, the power P of the line DL2 is negative when the voltage is Va2, so that the power converter 16 also charges the power element 26.

Here, the control unit 100 of the power converter 11 determines how the power element 21 and the power element 26 are charged. When the control unit 100 of the power converter 11 refers to the line DL41, which is a reference function of the power converter 14 stored in the storage 103, the power P has a positive value when the voltage of the bus 30 is Va2. That is, in a case where the voltage of the bus 30 is Va2, it is determined that the power converter 14 is outputting to the bus 30 and the power element 21 and the power element 26 are being charged by the output from the power element 22 and the output from the power element 24. In this case, the control unit 100 of the power converter 11 calculates the renewable energy charge amount by calculating the following Expression (4). In addition, the control unit 100 of the power converter 11 records the calculated renewable energy charge amount in the storage 103 as a history together with the calculated date and time.

$$P_{RE}(t+1)=P_{RE}(t)+P_{IO}(t)\times(3\times Va2-2\times Vc-Vb)/(Va2-Vc) \quad (4)$$

When a plurality of sets of the power converter 16 and the power element 26 are connected to the bus 30, the power converter 11 also stores reference functions of these power converters, and calculates the renewable energy charge amount based on the stored reference functions.

Figure 15:
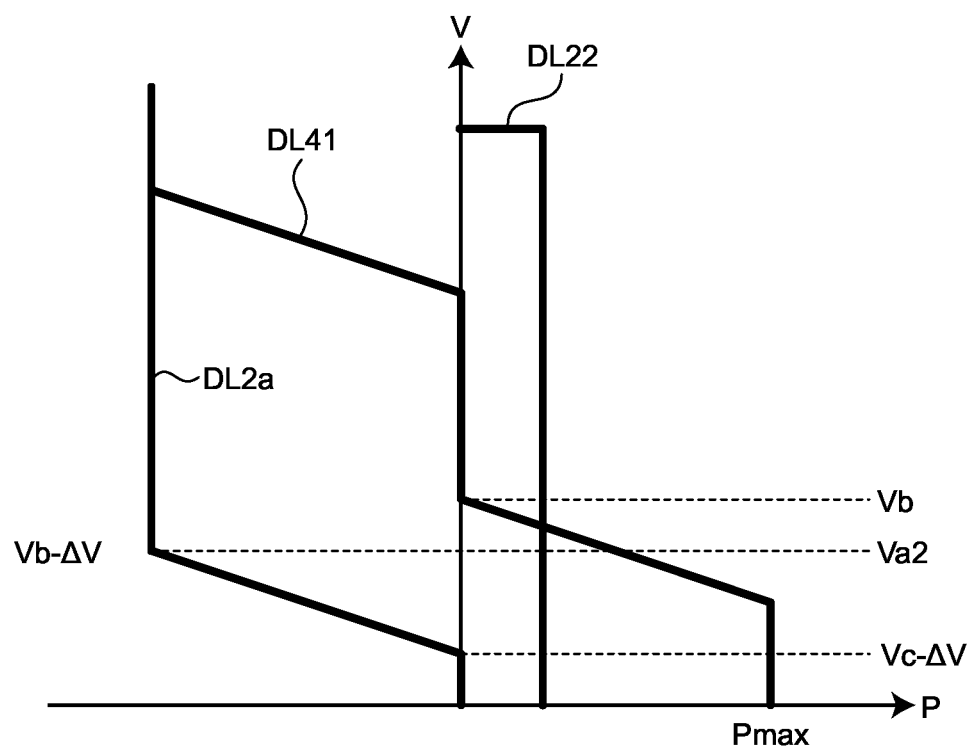
FIG. 15 is a diagram illustrating an example of a reference function.

In the present disclosure, when the voltage drop across the bus 30 is large, the power converter 11 may correct the stored reference function to manage the renewable energy charge amount. FIG. 15 is a diagram illustrating a reference function of the power converter 11 corrected from the line DL2 to the line DL2a in consideration of the voltage drop across the bus 30. For example, when the voltage drop across the bus 30 between the power converter 12 and the power converter 11 is ΔV, the power converter 11 shifts the line DL2 illustrated in FIG. 9 downward by ΔV to obtain the line DL2a illustrated in FIG. 15. When the output of the power element 22 is small, Vc in the above Expression (2) is replaced with Vc-ΔV to calculate the renewable energy charge amount.

According to the present disclosure, input and output of power derived from renewable energy may be managed for a power element that may be charged with both power from a commercial electric power system and power derived from renewable energy.

What is claimed is:

1. A power converter comprising:
   a power conversion unit connected to a DC bus to which a first power converter configured to convert and output power supplied from an electric power system and a second power converter configured to convert and output power supplied from a power generation device configured to generate power using renewable energy are connected, the power conversion unit being configured to
   convert power input from the bus,
   output the converted power to a power element capable of being charged and discharged,
   convert power input from the power element, and
   output the converted power to the bus;
   a measurement unit configured to measure an electrical characteristic value of each of power input from the bus to the power conversion unit and power output from the power conversion unit to the bus;
   a storage unit configured to store a first reference function in which a target electrical characteristic value is defined according to the electrical characteristic value measured by the measurement unit, and a second reference function in which a target electrical characteristic value of the first power converter is defined according to an electrical characteristic value measured by the first power converter;
   a setting unit configured to set a power conversion characteristic of the power conversion unit based on an electrical characteristic value determined by the first reference function according to the electrical characteristic value measured by the measurement unit; and
   a management unit configured to manage, based on the electrical characteristic value measured by the measurement unit when power is supplied from the bus to the power conversion unit and the second reference function, a renewable energy charge amount that is a charge amount to the power element by power derived from renewable energy supplied from the second power converter to the power conversion unit, and manage, based on the electrical characteristic value measured by the measurement unit when power is supplied from the power element charged with power derived from renewable energy to the bus via the power conversion unit and the renewable energy charge amount, an amount of power derived from renewable energy supplied from the power element.

2. The power converter according to claim 1, further comprising an update unit configured to update the first reference function according to the renewable energy charge amount.

3. The power converter according to claim 2, wherein the update unit is configured to update a maximum value of a target value of an output of the power conversion unit, the maximum value being defined by the first reference function according to the renewable energy charge amount.

4. The power converter according to claim 1, wherein
   the storage unit is configured to store a reference function in which a target electrical characteristic value of a power converter is defined for each of a plurality of power converters configured to convert power input from the bus, output the converted power to a power element capable of being charged and discharged, convert power input from the power element, and output the converted power to the bus, and
   the management unit is configured to manage a renewable energy charge amount that is a charge amount to the power element by power derived from renewable energy supplied from the second power converter to the power conversion unit based on the electrical characteristic value measured by the measurement unit when power is supplied from the bus to the power conversion unit, the second reference function, and a reference function of each of the plurality of power converters.

5. The power converter according to claim 1, wherein the management unit is configured to correct the first reference function based on a voltage drop of the bus.

6. A power system comprising:
   a first power converter configured to convert and output power supplied from an electric power system;

a second power converter configured to convert and output power supplied from a power generation device configured to generate power using renewable energy;

a DC bus to which the first power converter and the second power converter are connected; and a power converter including:
- a power conversion unit connected to the bus and configured to convert power input from the bus, output the converted power to a power element capable of being charged and discharged, convert power input from the power element and output the converted power to the bus;
- a measurement unit configured to measure an electrical characteristic value of each of power input from the bus to the power conversion unit and power output from the power conversion unit to the bus;
- a storage unit configured to store a first reference function in which a target electrical characteristic value is defined according to the electrical characteristic value measured by the measurement unit, and a second reference function in which a target electrical characteristic value of the first power converter is defined according to an electrical characteristic value measured by the first power converter;
- a setting unit configured to set a power conversion characteristic of the power conversion unit based on an electrical characteristic value determined by the first reference function according to the electrical characteristic value measured by the measurement unit; and
- a management unit configured to
  - manage, based on the electrical characteristic value measured by the measurement unit when power is supplied from the bus to the power conversion unit and the second reference function, a renewable energy charge amount that is a charge amount to the power element by power derived from renewable energy supplied from the second power converter to the power conversion unit, and
  - manage, based on the electrical characteristic value measured by the measurement unit when power is supplied from the power element charged with power derived from renewable energy to the bus via the power conversion unit and the renewable energy charge amount, an amount of power derived from renewable energy supplied from the power element.

7. The power system according to claim 6, further comprising:

a third power converter connected to the bus and configured to request power derived from renewable energy from the power converter, and convert power supplied from the power converter to output the converted power to a connected power element, wherein the third power converter is configured to store a reference function in which a target electrical characteristic value is defined according to a measured electrical characteristic value, and power of an input is decreased according to a decrease in a voltage of the bus, and decreases an output to the connected power element based on the reference function according to the decrease in the voltage of the bus.

8. A method for controlling a power converter including a power conversion unit connected to a DC bus to which a first power converter configured to convert and output power supplied from an electric power system and a second power converter configured to convert and output power supplied from a power generation device configured to generate power using renewable energy are connected, convert power input from the bus to output the converted power to a power element capable of being charged and discharged, and convert power input from the power element to output the converted power to the bus, the method comprising:

a measurement step of measuring an electrical characteristic value of each of power input from the bus to the power conversion unit and power output from the power conversion unit to the bus;

a setting step of setting a power conversion characteristic of the power conversion unit based on an electrical characteristic value determined by a first reference function in which a target electrical characteristic value is defined according to the electrical characteristic value measured in the measurement step; and a management step of managing a renewable energy charge amount that is a charge amount to the power element by power derived from renewable energy supplied from the second power converter to the power conversion unit based on the electrical characteristic value measured in the measurement step when power is supplied from the bus to the power conversion unit and a second reference function in which a target electrical characteristic value of the first power converter is defined according to an electrical characteristic value measured by the first power converter, and managing an amount of power derived from renewable energy supplied from the power element based on the electrical characteristic value measured in the measurement step when power is supplied from the power element charged with power derived from renewable energy to the bus via the power conversion unit and the renewable energy charge amount.

* * * * *